Aug. 19, 1952     W. W. ARNOLD     2,607,882
ILLUMINATED LEVEL

Filed Aug. 26, 1949     2 SHEETS—SHEET 1

Inventor
William W. Arnold

By *Clarence A. O'Brien and Harvey B. Jacobson*
Attorneys

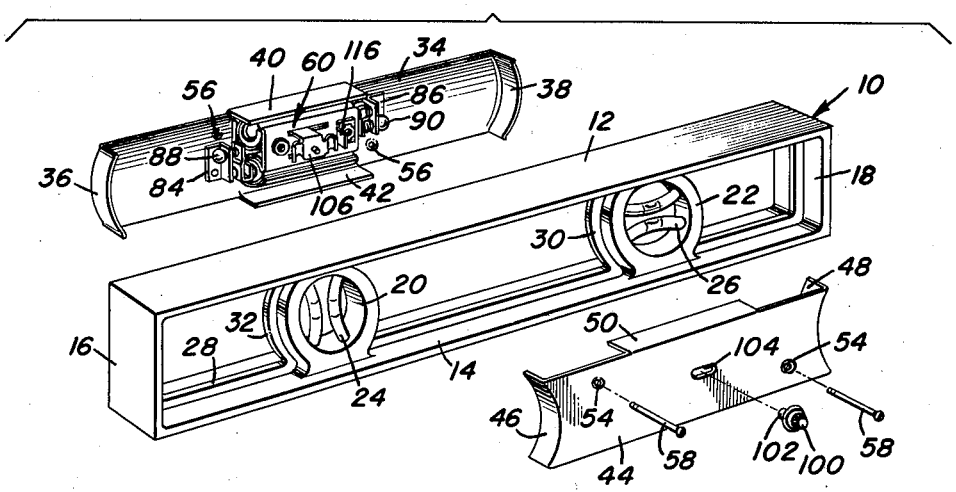
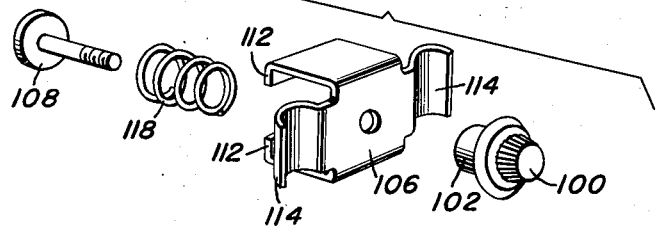
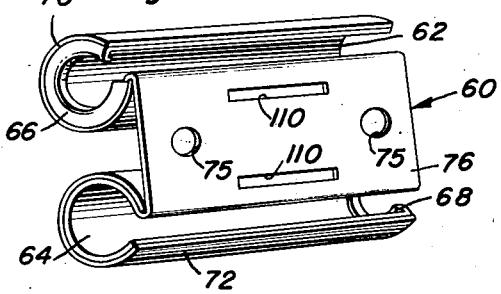
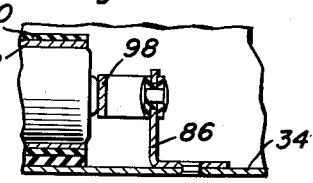
Inventor
William W. Arnold

Patented Aug. 19, 1952

2,607,882

UNITED STATES PATENT OFFICE 2,607,882

ILLUMINATED LEVEL

William W. Arnold, Jennings Lodge, Oreg.

Application August 26, 1949, Serial No. 112,503

5 Claims. (Cl. 240—6.44)

This invention relates to new and useful improvements in carpenter's levels and the primary object of the present invention is to provide an illuminated level that can be conveniently utilized for trueing up structural elements at night or under poor lighting conditions.

Another important object of the present invention is to provide an illuminated level including a light unit that is quickly and readily applied to or removed from a level in a convenient manner.

A further object of the present invention is to provide an attachment for levels including a small and compact light unit that is so constructed as to add very little weight to the level on which the same is applied.

A still further aim of the present invention is to provide an illuminated level that is strong and reliable in use, simple and practical in construction, neat and attractive in appearance, relatively inexpensive to manufacture, and otherwise well adapted for the purposes for which the same is intended.

Other objects and advantages reside in the details of the construction and operation as more fully hereinafter described and claimed, reference being had to the accompanying drawings forming part hereof, wherein like numerals refer to like parts throughout, and in which:

Figure 6 is a group perspective view of the present invention;

Figure 7 is a group perspective view of the switch mechanism used in conjunction with the present invention;

Figure 8 is a perspective view of the battery holder used in conjunction with the present invention; and, Figure 9 is an enlarged, longitudinal horizontal sectional view taken substantially on the plane of section line 9—9 of Figure 2.

Figure 1:
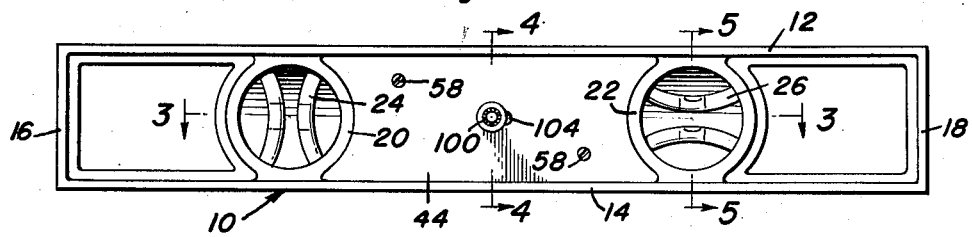
Figure 1 is a front elevational view of the present invention.
Figure 2:
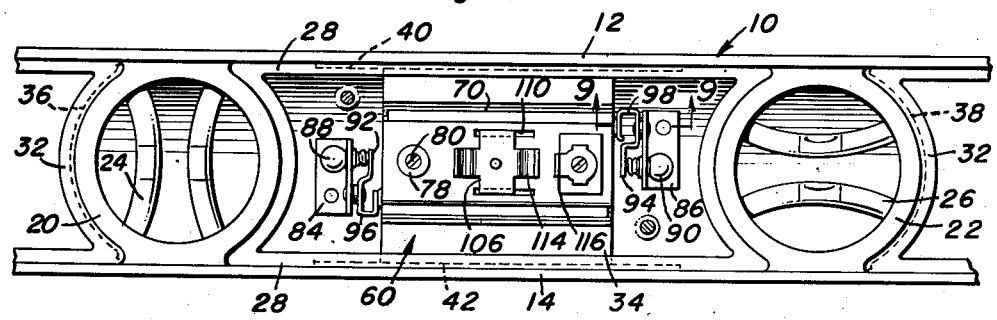
Figure 2 is an enlarged view of Figure 1 and with the anchor plate removed for the convenience of explanation.
Figure 3:
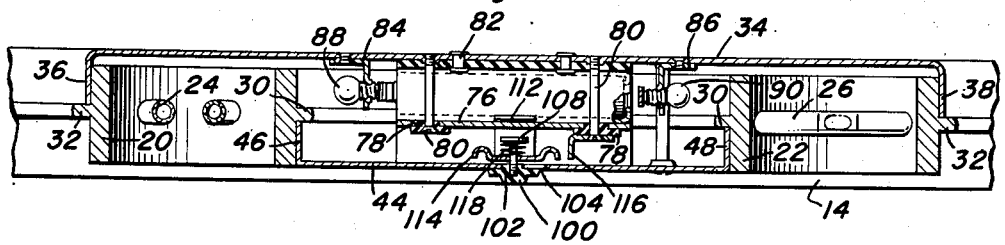
Figure 3 is an enlarged longitudinal, horizontal sectional view taken substantially on the plane of section line 3—3 of Figure 1.
Figure 4:
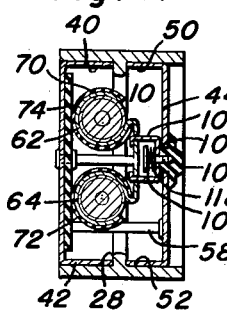
Figure 4 is an enlarged vertical sectional view taken substantially on the plane of section line 4—4 of Figure 1.
Figure 5:
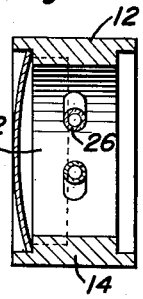
Figure 5 is an enlarged vertical sectional view taken substantially on the plane of section line 5—5 of Figure 1.

Referring now to the drawings in detail, wherein for the purpose of illustration, there is disclosed a preferred embodiment of the present invention, the numeral 10 represents a carpenter's level generally, including an open substantially rectangular frame having upper and lower walls 12 and 14, and end walls 16 and 18.

A pair of substantially circular level tube units or supports 20 and 22 are integrally formed with the upper and lower walls 12 and 14. The units 20 and 22 are disposed adjacent the end walls 16 and 18. The unit 20 supports a pair of vertically disposed arcuate level tubes 24 and the unit 22 supports a pair of horizontally disposed arcuate level tubes 26.

Internal webs or reinforcing ribs 28 are provided on the walls 12, 14, 16 and 18. Inner and outer arcuate ribs 30 and 32 are provided on each of the units 20 and 22. These latest ribs, 30 and 32, reinforce and strengthen the level units and have a further function which will later be more fully apparent.

The present invention does not attempt to claim the above described well known level construction, but is merely an attachment therefor whereby the level units may be conveniently observed under poor lighting conditions.

The numeral 34 represents an elongated substantially rectangular support plate having concavo-convexed flanges 36 and 38 as its ends that embrace the level units 20 and 22. The outer and forward edges of the flanges 36 and 38 bear against the rear surfaces of the outer ribs 32.

Forwardly extending, spaced parallel upper and lower flanges 40 and 42 project laterally from the support plate 34 and bear against the rear surfaces of the ribs 28 on the upper and lower walls 12 and 14, intermediate the level units, to strengthen the support and to prevent bending of the support.

Means is provided for detachably securing the support 34 to the level 10 and this means comprises an elongated substantially rectangular anchor plate 44 having concavo-convexed flanges 46 and 48 at its ends. The outer concaved surfaces of the flanges 46 and 48 bear against the inner convexed surfaces of the level units 20 and 22, and the rear and outer edges of the flanges 46 and 48 bear against the forward surfaces of the inner ribs 30.

Upper and lower, spaced parallel, rearwardly extending flanges 50 and 52 project laterally from the anchor plate 44 and rest against the forward surfaces of the ribs 28 on the upper and lower walls 12 and 14 to prevent inward bending of the anchor plate and to retain the anchor plate spaced parallel to the support plate.

The anchor plate 44 is provided with a pair of diagonally disposed apertures 54 that register with internally threaded openings 56 in the support plate 34. Bolts 58 enter the apertures 54 and are threaded in the openings 56 for detachably connecting the anchor plate to the support plate.

A battery holder 60 of resilient, bendable material is mounted on the support plate 34 and this holder consists of a substantially rectangular plate having its end portions bent to provide upper and lower split sleeves 62 and 64. A retaining flange 66 is provided at one end of the sleeve 62 and a further retaining flange 68 is provided at the opposite end of the sleeve 64.

The sleeves 62 and 64 are embraced by split sleeves 70 and 72 of insulating or non-conductive material that rest against an insulated pad 74 on the inner face of the support plate 34.

Yieldingly retained in openings 75 provided in the central portion 76 of the holder 60, are resilient, non-conductive sleeves 78 that receive fasteners 80 which secure the holder 60 and pad 74 to the support plate 34. The pad 74 is further secured to the support plate 34 by rivets or the like 82.

Upper and lower angle brackets or lamp holders 84 and 86 are secured to the support plate 34 and are provided with threaded openings that receivably engage lamp bulbs 88 and 90. Contact fingers 92 and 94 are mounted on the brackets 84 and 86, yieldingly bear against the bases of the lamp bulbs, and are provided with channeled portions 96 and 98 that bear against the terminals of batteries that are received in the sleeves 62 and 64.

A finger grip 100 includes a shank portion 102 that is slidably received in an elongated slot 104 provided in the anchor plate 44. The web portion of a substantially U-shaped switch member 106 is secured to the shank portion 102 by a fastener 108 and the leg portions of the switch member are slidably received in parallel slots 110 in the central portion 76 of the holder 60. Retaining flanges 112 on the leg portions of the switch member are disposed behind the portion 76 to prevent disengagement of the switch member from the holder 60.

Contact channels 114 are integrally formed with the switch member 106 and one of these contact channels will engage a contact plate 116 mounted on one of the fasteners 80 when the switch member is moved in one direction by the finger grip 100 to ground the batteries and complete the circuit to the lamp bulbs whereupon the lamp bulbs will become energized.

A coil spring 118 embraces the fastener 108 and is biased between the head of the fastener 108 and the web portion of the switch member 106 to yieldingly retain the switch member in a selected adjusted position or in a circuit open or circuit closed position.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An illuminating level comprising a substantially rectangular frame, a pair of leveling units mounted on said frame, a combined reflector and support plate extending between and past the level units and spaced laterally from the level units and having end flanges resting against the level units, a pair of illuminating members mounted on said support plate between the level units for directing light rays toward the ends of the plates and behind the level units for illuminating the level units, a source of power for said illuminating members, a switch controlling the circuit to the illuminating members, ribs on the level units, an anchor plate extending between the level units and having flanged portions bearing against the ribs, and means securing the anchor plate to the support plate and said flanged portions against said ribs.

2. An illuminating level comprising a substantially rectangular frame, a pair of level units mounted on said frame, a support plate extending between and past the level units and having end flanges resting against the level units, a pair of illuminating members mounted on said support plate for illuminating the level units, a source of power for said illuminating members, a switch controlling the circuit to the illuminating members, ribs on the level units, an anchor plate having flanged portions bearing against the ribs, means securing the anchor plate to the support plate, a holder mounted on said support plate for said source of power, said holder including a pair of spaced sleeves for yieldingly receiving a pair of batteries, said switch being slidably mounted on said holder, and a finger grip for said switch slidably mounted on said anchor plate said level units including rear faces spaced laterally from the support plate to define spaces through which light rays from the illuminating members are directed to pass behind the level units.

3. An illuminating level comprising a substantially rectangular frame, a pair of leveling units mounted on said frame, a support plate extending between and past said leveling units and having end flanges resting against said leveling units, said leveling units being confined between said end flanges, an anchor plate extending between said leveling units and having end flanged portions, ribs on said leveling units engaged by said flanged portions, fasteners extending through said support plate and said anchor plate and directly connecting the support plate to the anchor plate, said leveling units including rear faces spaced laterally from the support plate, and lamp bulbs carried by said support plate for directing light rays into the space between the rear faces of the leveling units and the support plate behind said leveling units.

4. An illuminating level comprising a substantially rectangular frame, a pair of leveling units mounted on said frame, a support plate extending between and past said leveling units and spaced laterally from the leveling units, said plate having end flanges resting against said leveling units, said leveling units being confined between said end flanges, an anchor plate extending between said leveling units and having end flanged portions, ribs on said leveling units engaged by said flanged portions, fasteners extending through said support plate and said anchor plate and directly connecting the support plate to the anchor plate, a holder supported solely by said support plate, batteries on said holder, lamp bulbs on said support plate and between said support plate and said anchor plate for directing light rays between the support plate and the leveling units and behind the leveling units, a switch member slidably carried by the holder for selectively making and breaking a circuit to said lamp bulbs, a finger grip slidably carried by the anchor plate and connected to the switch member for sliding the member, and spring means acting on said finger grip and yieldingly urging the finger grip against the outer face of said anchor plate.

5. The combination of claim 4 wherein said switch member includes a channel having spaced leg portions and a web portion joining said spaced leg portions, said holder having a pair of parallel slots receiving said leg portions, and flanges on said leg portions contacting said holder and of a width greater than the width of said slots to restrict removal of the channel from the holder.

WILLIAM W. ARNOLD.

REFERENCES CITED

The following references are of record in the file of this patent:

UNITED STATES PATENTS

| Number | Name | Date |
|---|---|---|
| 2,198,945 | Morris | Apr. 20, 1940 |
| 2,453,091 | Holloway et al. | Nov. 2, 1948 |